(12) United States Patent
Ishikawa et al.

(10) Patent No.: US 6,534,952 B1
(45) Date of Patent: Mar. 18, 2003

(54) SPIRAL ELECTRODE GROUP WINDING METHOD AND DEVICE AND BATTERY USING THEM

(75) Inventors: Teruhisa Ishikawa, Osaka (JP); Yasufumi Tanaka, Aichi (JP); Takeharu Nakanose, Osaka (JP); Yoshiki Osawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/129,523

(22) PCT Filed: Nov. 7, 2000

(86) PCT No.: PCT/JP00/07814
§ 371 (c)(1),
(2), (4) Date: Aug. 21, 2002

(87) PCT Pub. No.: WO01/35481
PCT Pub. Date: May 17, 2001

(30) Foreign Application Priority Data

Nov. 8, 1999 (JP) ............................................ 11-316736

(51) Int. Cl.$^7$ .............................. H02J 7/00; H01M 6/00
(52) U.S. Cl. ........................ 320/107; 429/48; 29/623.1
(58) Field of Search ............................ 320/107; 429/48, 429/94, 164, 163; 29/2, 623.1, 829

(56) References Cited

U.S. PATENT DOCUMENTS 4,049,883 A * 9/1977 Schenk et al. .............. 29/623.1
5,791,041 A * 8/1998 Miyata et al. ................ 429/94
6,462,780 B1 * 10/2002 Stephany et al. ........... 320/112

FOREIGN PATENT DOCUMENTS

| JP | 6-96801 | 4/1994 |
| JP | 8-153519 | 6/1996 |
| JP | 9-120822 | 5/1997 |
| JP | 11-40144 | 2/1999 |
| JP | 11-97056 | 4/1999 |
| JP | 11-171382 | 6/1999 |

* cited by examiner

Primary Examiner—Michael Sherry
Assistant Examiner—Pia Tibbits
(74) Attorney, Agent, or Firm—Wenderoth, Lind & Ponack, L.L.P.

(57) ABSTRACT

An electrode group winding method and device for batteries provides for winding continuous belt-shaped anode plates, cathode plates and separators into groups of spiral electrodes by means of a turnable winding core. In a specified position in the vicinity of the winding core, an edge of a belt-shaped electrode plate is detected by an edge position detector for comparison with a reference position, and a chuck movable from an end of the electrode plate in a running direction of the electrode plate and a perpendicular direction thereof is used to grip the electrode plated based on the comparison result to correct the edge position of the electrode plate. Then, a second chuck restricted in its movement to only a direction parallel to the moving direction of the electrode plate by a guide is used to hold the electrode plate. Then, a third chuck is used to hold the electrode plate to supply the tip end of the electrode plate to the winding core, and winding into groups of electrodes is completed while preventing the edge position deviations of electrode plates by the second chuck and applying tension to electrode plates, thereby providing a winding method and device capable of winding electrode plates with minimum winding deviations. In addition, the sectional shape at right angles with the winding core shaft is made generally hexagonal so as to improve flatness required when electrode groups are aligned flat.

8 Claims, 9 Drawing Sheets

(a)

(b)

(c)

(a)

(b)

(c)

SPIRAL ELECTRODE GROUP WINDING METHOD AND DEVICE AND BATTERY USING THEM

DESCRIPTION

1. Technical Field

The present invention relates to a winding method for producing battery electrode groups by winding in a spiral shape both a battery anode (negative electrode) and a battery cathode (positive electrode) superimposed on each other with a separator disposed therebetween as used in lithium secondary batteries, nickel hydrogen batteries and the like, and also relates to a device employing the

2. Background Art

In constructing small and high capacity secondary batteries that are mass-produced, electrode groups formed of such electrode materials as belt-shaped anodes, cathodes, separators and the like superimposed one over another and wound in a spiral shape, respectively, have so far been employed in general. Respective anodes and cathodes are prepared by the steps of filling a paste with an active material serving as the main ingredient in a conductive substrate, drying the paste, performing roll pressing steps for a thickness adjustment of the electrode plates and making the active material layer high in density, cutting the electrode plates to a predetermined width with the used of a slitter to appear belt-shaped and further attaching a lead wire and the like to the respective electrode plates. Separators are formed of a belt-shaped porous polypropylene film and what is generally used are electrode groups, each produced by the steps of having both the foregoing anode and cathode plates superimposed one over another with a predetermined positional relationship maintained and with the separator disposed therebetween, and having the foregoing electrode and separator combination wound around a winding core in a spiral shape tightly without leaving any gaps left between the wound layers.

In producing secondary batteries by the use of electrode groups formed in the foregoing spirally wound body, it is a general practice to produce such spirally wound bodies by putting in place on four unreeling axes that are disposed in parallel with one another the electrode materials of an anode plate, a cathode plate, a first separator and a second separator, all being wound in a roll-shape, respectively. Further, winding cores are provided in parallel to the respective four unreeling axes and the respective tip ends of the electrode materials are tentatively fixed to the winding cores and the respective winding cores are rotated at a constant speed in a predetermined direction.

A tension unit is incorporated in the transportation route of the electrode materials to control a tension applied to thereto so that a tension suitable for winding the electrode groups is applied to each respective electrode material. As the winding core rotates, each respective belt-shaped material constituting the foregoing electrode groups is transported towards the winding core along with the rotation of the unreeling axis and wound around the winding core.

When electrode groups are produced by the use of a winding device as described above, respective anode and cathode plates wound in a roll-shape and fit to an unreeling axis are brought into contact with the periphery of each respective roller that is provided in a plurality for acting as a direction change unit, tension unit and the like and conveyed by running due to the rotation of the rollers. During the foregoing process, irregular end surfaces created on the respective anode and cathode plates in the working steps thereof variations in thickness from place to olace thereof, a localized unlevel condition created in the thickness thereof due to the attachment of lead wires, variations in machining of the electrode plate transporting rollers of the winding device, variations in mounting of the roller axes and the like gradually produce a velocity component perpendicular to the normal running direction thereof, thereby bringing the electrode plates into a meandering movement with the resulting great possibilities of causing a "staggered winding" of the electrode groups.

For reference, a description is given to the case where the width of an electrode material mainly used in a lithium secondary battery is involved. In general, a first separator and a second separator are of the same width and set to around 40 to 60 mm at the maximum of the electrode materials. The width of each respective anode (negative electrode) plate is large after that and the width of the cathode (positive electrode) plate is made the smallest among the electrode materials. Since the difference in width between the separator and the anode plate is about 2 mm and the difference between the anode plate and the cathode plate is about 1 mm, the process of electrode group winding has to be performed carefully so as to have the cathode plate remain within the width of the anode plate that is located opposite to the cathode plate with the separator sandwiched therebetween. In addition, the anode plate is not allowed to extend outside of the width of the separator. Even when the relative positional relationships among the three different electrode materials as described above are satisfied, the respective electrode materials are not allowed to be noticeably displaced in the axial direction of the winding axis as the winding turn to the respective electrode materials increases.

When the foregoing conditions are not satisfied, such defects as battery's internal short circuits and instability of battery capacity are caused. In the extreme case, it becomes difficult for the electrode groups to be housed in the battery case, resulting in problems not only in the battery's performance aspect but also the battery's safety and productivity aspects.

Therefore, a variety of meandering prevention units has been so far employed in the course of electrode materials transportation extending film the unreeling axis to the winding core. Here, some of the equipment is introduced. The most widely used meandering prevention unit is installed at the place where an unreeling axis fit with a roll of each respective electrode material is located. More specifically, the edge position of the electrode material released from the roll is compared with the predetermined reference position and a positional displacement is detected by the use of an optical sensor and the like. Based on the detection result, the unreeling axis fit with the electrode material roll is moved in the direction of the axis core, thereby allowing the edge position of the electrode material to be returned to the predetermined position with an accuracy of 0.1 mm max. This kind of unit is generally for a heavy weight electrode material roll and likely to become large in size and slow in response and, therefore, not suitable for a winding device requiring a high speed and a high degree of accuracy.

According to the Japanese Patent Application Laid-open Publication No. H11-40144, what is characterized by correcting automatically the edge positions of electrode plates is disclosed as FIG. 6 shows. In FIG. 6, there are two axial cores 32a and 33a located perpendicularly to the running direction of respective cathode and anode plates 1 and 3 and the two axial cores are disposed in parallel with each other.

An electrode plate is sandwiched between a pair of rollers 32 and 33 held by axial cores 32a and 33a in a rotatable manner, respectively, and the pair of rollers are prepared so as to be allowed to rotate without slippage when the electrode plate is transported. Edge detecting means 34 is disposed in the vicinity of the pair of rollers to detect the edge positions of the electrode plate and, based on the detection results of edge detecting means 34, the pair of rollers are shifted in position in the roller's axial core direction, thereby correcting the edge positions of the electrode plate automatically.

According to the Japanese Patent Application Laid-open Publication No. H9-120822, a staggered winding prevention unit is disclosed as FIG. 7 shows. In FIG. 7, electrode materials 1 and 3 are cut to a predetermined length to form a rectangular shape, respectively, and the winding end part of each respective rectangular material is gripped in the vicinity thereof by gripping means 29 that is freely movable by sliding in the winding direction along guiding means 28 and, at the same time, cathode plate 1 and anode plate 3 are wound around winding core 7 together with separator 5a via fixing tape while a tension being applied to gripping means 29 in the direction opposing to the winding direction. However, when batteries are produced according to these conventional technologies, there are such problems as a drawback found in the productivity of electrode groups itself, a degraded production yield rate of batteries, an increased variation in quality of batteries and the like.

Further, even at the time of performing an edge control finally, according to the Japanese Patent Application Unexamined publication No. H11-40144, an edge controlling means, whereby an electrode plate is sandwiched between a pair of rollers to correct edge positions, is installed in the vicinity of a winding core, resulting in the possibility of damaging the electrode plate due to an excessive force imposed thereto. Therefore, the edge controlling means is not allowed to be disposed near the winding core, thereby bringing about the danger of staggering edge positions again during the period of time between the time of meandering correction and the time of reaching the winding core as the electrode plate rotates with the roller.

According to the edge control method as disclosed by the Japanese Patent Application Unexamined Publication No. H9-120822, whereby rectangular electrode materials, each being held at the end part thereof by a gripping means that is movable along a guide, are fixed to a separator at the winding start part of respective anode and cathode plates by the use of a fixing tape and then the separator is fit in a slit of the winding core, thereby having the electrode materials wound as the winding core is rotated, staggered winding hardly occurs and the accuracy of staggered winding observed with electrode groups is expected to be excellent. However, in what way the end part of the respective sheet-like electrode materials is fed to the gripping means automatically and efficiently and gripped thereby is not disclosed and it is not expected that sufficient productivity can be realized. Also, the use of a fixing tape that is irrelevant to the performance of batteries makes this method present problems in terms of performance and costs.

Conventional winding core 7 is circular in cross section as FIG. 8 (a) shows and, when the cylindrically wound electrode group as shown in FIG. 8 (b) is flattened in shape by applying a pressing force thereto, the positions, where the electrode group is bent, are not fixed, thereby presenting the problem of not allowing the positions, where lead wires of the electrodes are taken out, to be fixed. In addition, the cross-section of the electrode group looks like a cocoon as FIG. 8 (c) shows, thereby causing an adverse effect to the flatness of the electrode group when it comes to the flat shaping thereof.

Recently, as disclosed in the Japanese Patent Application Unexamined Publication No. H6-96801, a flat winding core shaped like a rectangle in cross section has been employed in winding electrode groups. FIG. 9 (a) shows a typical flat-shaped winding core. FIG. 9 (b) an FIG. 9 (c) are cross-sectional views of an electrode group formed by winding around the winding core and another electrode group shaped flatly with a pressing force applied thereto, respectively. It this case, the volumetric efficiency of the electrode groups in the battery case is excellent but there are such problems as staggered windings likely to be caused by pulsation in the peripheral speed of winding around the winding core, difficulties in having the winding core shaped flat in cross section taken out of the wound electrode group, poor retainability of electrolyte because of lack of leeway in separator and space, and the like.

SUMMARY OF THE INVENTION

In order to solve the problems as described above, the present invention discloses an electrode group winding method whereby, when long belt-like electrode materials are would to form an electrode group, an electrode group with an extremely small amount of staggered windings realized by correcting efficiently and accurately the shifts in position created on a variety of electrode materials such as cathode plate 1, anode plate 3 and the like in the direction of transportation hereof and also in the direction perpendicular thereto is allowed to be produced continuously without cutting the electrode materials to a rectangle-shape and also with excellent flatness, and provides a device utilizing the method and batteries with stabilized quality and excellent productivity.

A spiral electrode group winding method based on the present invention comprises the steps of:

fitting long belt-like electrode materials such as an anode plate, a cathode plate and a separator to an unreeling axis, respectively;

transporting the electrode materials towards respective winding cores while the transportation directions are changed via a meandering prevention unit, a tension unit and a plurality of electrode materials transportation rollers that are put in place on the transportation route extending from the unreeling axis to the winding core to take up the electrode materials, respectively;

detecting edge positions of respective belt-like electrode materials, particular of the anode and cathode plates, at a predetermined position in the vicinity of the winding core but the use of an edge detecting means to compare the detected edge positions with the reference portion; and correcting the positional shifting of the edges of electrode plates in the direction perpendicular to the transportation direction of the electrode plates based on the detection results by the use of a chuck driving means formed of a servomotor and a ball screw after the electrode plate is gripped by a pair of fingers of a chuck extending from the end part of the electrode plate id the direction perpendicular to the running direction of the electrode plate.

Once the edge position of an electrode plate is automatically corrected with a sufficient degree of accuray, the distal end pan of the electrode plate extending over the length needed to finish one winding of spiral electrode group is gripped by a second chuck, the shifting of which is restricted to a direction parallel to the transportation direction of the electrode plate by means of a guide disposed in parallel to the transportation direction of the electrode materials to prevent the positional shifting in the direction perpendicular to the running direction of the electrode plate, and further the electrode plate is gripped by a third chuck, which is restricted in the movement thereof in the direction parallel with the transportation direction of the electrode plate, at the distal end part of the electrode plate extending over the length needed to finish one winding of spiral electrode group and the tip end part of the electrode plate is fed to the winding core in such a way as to not cause a shift in position, thereby preventing a positional shift from taking place by an action of the second chuck and also performing the electrode group winding while a tension is applied thereto.

Also, the spiral electrode group winding method is characterized by producing spiral electrode groups continuously for the enhancement of productivity of the electrode groups without cutting the anode and cathode plates to a rectangular shape, respectively, by operating in a sequentially orderly manner the cutter for electrode cutting and the cutter for separator cutting installed near the winding core.

A spiral electrode group winding device of the present invention comprises:

an unreeling axis fit with a long belt-shaped electrode material; and a meandering prevention unit, a tension unit and a plurality of electrode material transporting rollers to transport the electrode materials towards a winding core while the direction of transportation is changed, which are disposed on the transportation route extending from the unreeling axis to the winding core to take the electrode materials, comprises:

an edge position detecting unit for detecting edge positions of an electrode plate disposed on each respective transportation route of both anode and cathode plates in the vicinity of a predetermined position of the winding core to correct finally the edge positions of the anode and cathode plates; and an edge position correcting chuck structured so as to be put in motion by a pair of fingers extending in the direction perpendicular to the running direction of the electrode plate, a servomotor and a ball screw, thereby correcting the edge positions by comparing with the reference position.

The spiral electrode group winding device is characterized by disposing a second chuck for winding the electrode groups while a tension is applied thereto with the electrode plate restricted in movement only in the direction parallel to the transportation direction of the electrode late by means of a guide after the edge positions of the electrode plate is corrected with a sufficient degree of accuracy in order to prevent a positional shift of the electrode plate in the direction perpendicular to the running direction thereof, and by disposing a third chuck to feed the tip end part of the electrode plate to the winding core under the condition where no positional shift of the electrode plate is taking place and disposing an electrode plate cutter between the third chuck and the winding core, thereby allowing the electrode plate to be cut at an immediate position before the winding core.

Batteries having the spiral electrode groups of the present invention built therein are characterized by being stabilized in quality and excellent in productivity.

BRIEF DESCRIPTION OF DRAWINGS

FIG. 5 is a cross-sectional view of a battery with the spiral electrode group of the present invention built in.

PREFERRED EXEMPLARY EMBODIMENTS OF THE INVENTION

Figure 1:
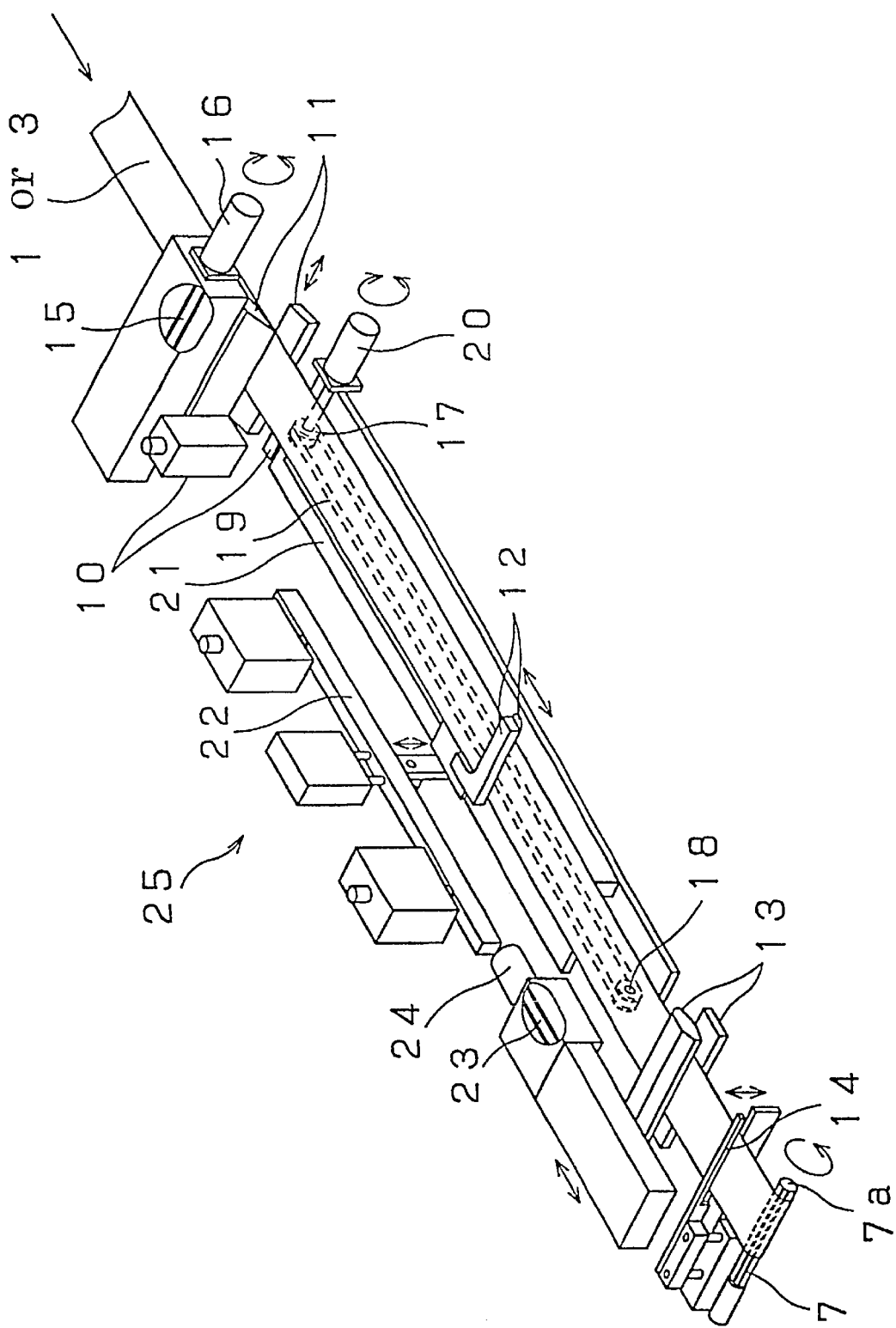
FIG. 1 is a perspective view of an edge position correcting unit that forms a principal part of the present invention.
Figure 2:
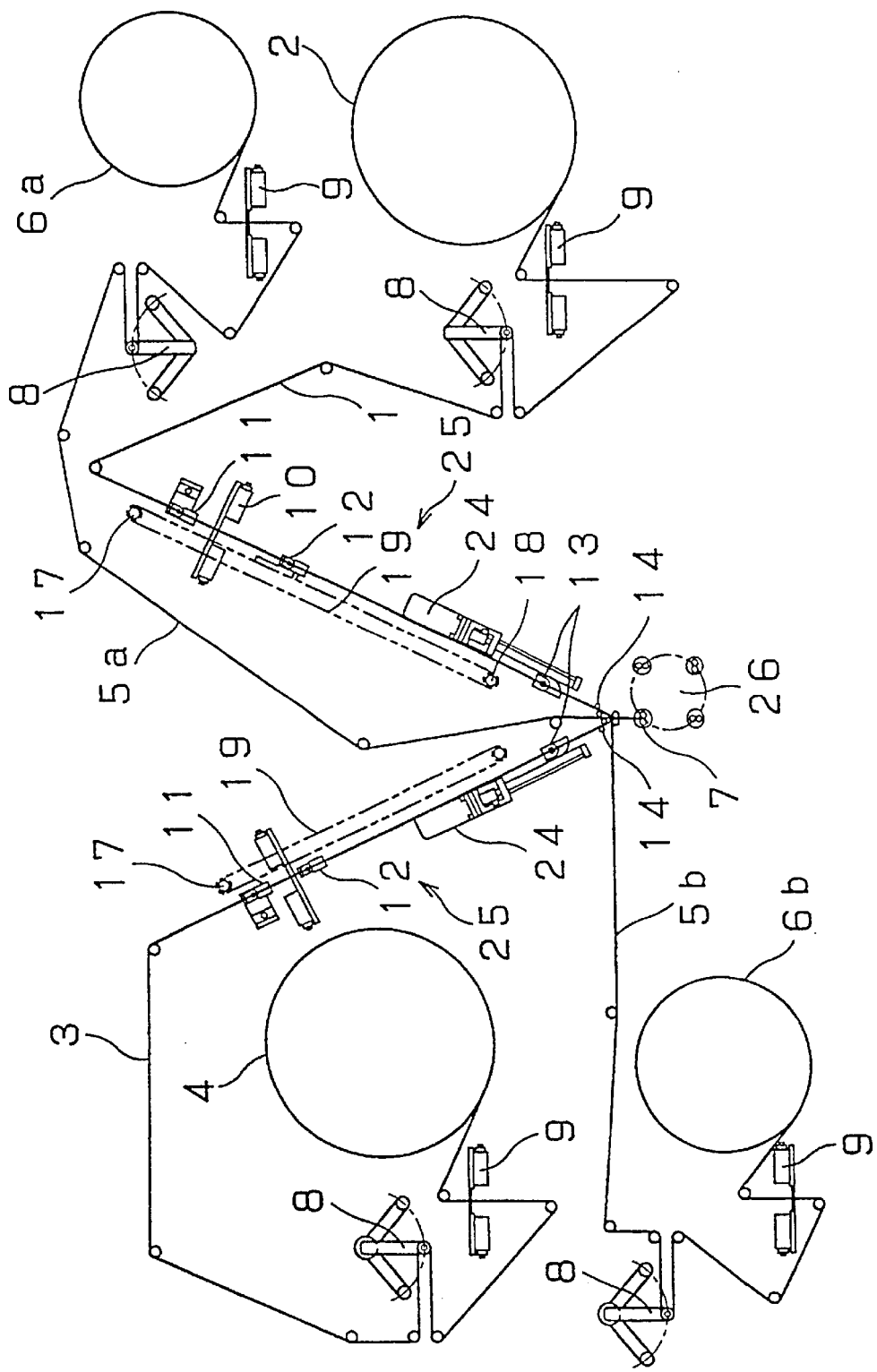
FIG. 2 is a front view to show a schematic structure of an entire electrode group winding device of the present invention.

Next, a description is given of a spiral battery electrode group winding method and a device employing the method in a few exemplary embodiments of the present invention with reference to the drawings. FIG. 1 is a perspective view of the essential section of an edge position correcting unit employed in an electrode group winding device of the present invention and structure for producing rectangular lithium secondary batteries. (In order to facilitate the understanding of the device, the drawing is simplified by showing how cathode plate 1 or anode plate 3 only is wound a round winding core 7 with a description of other electrode materials omitted.) FIG. 2 is a schematic illustration of the entire spiral battery electrode group winding device of the present invention.

Figure 4:
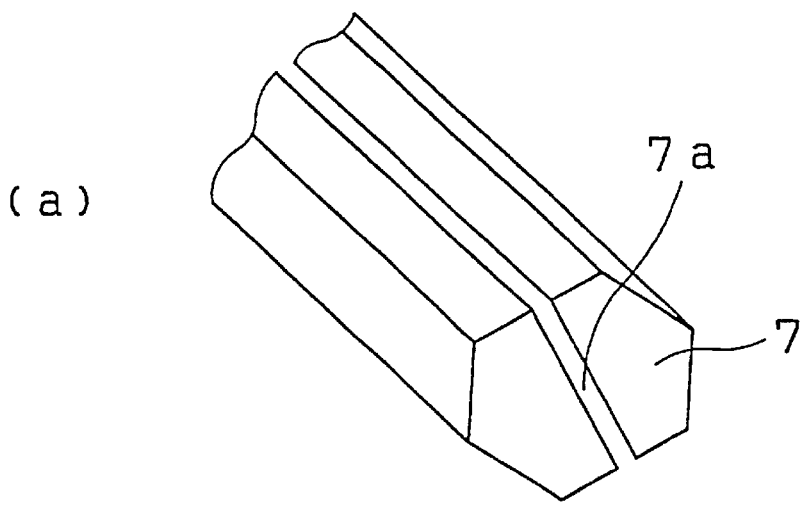
FIGS. 4 (a), (b) and (c) show a winding core of the present invention, a cross-sectional view of a wound spiral electrode group and a cross-sectional view of a spiral electrode group flattened by applying a pressing force thereto, respectively.
Figure 4:
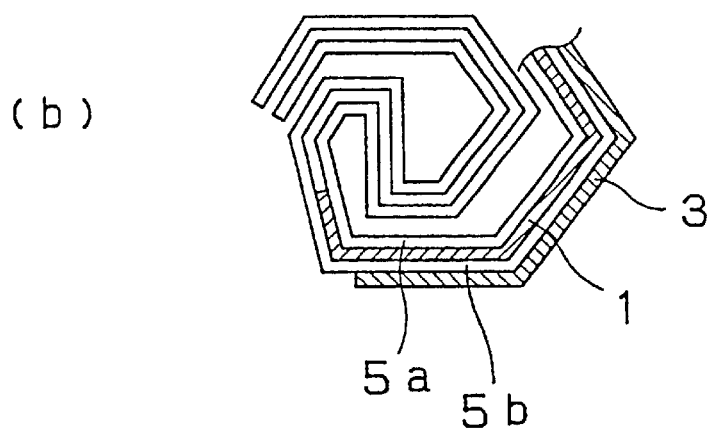
Figure 4:
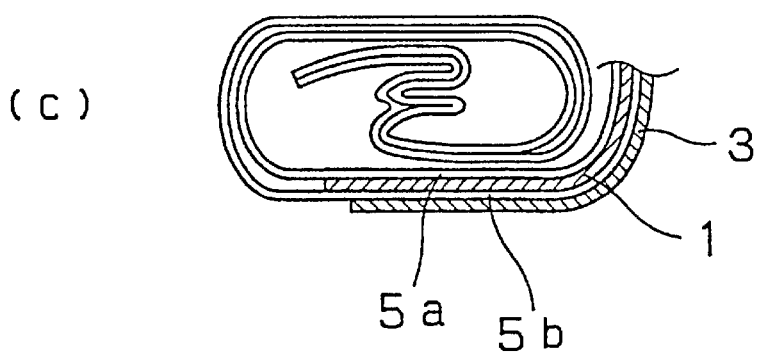
Figure 5:
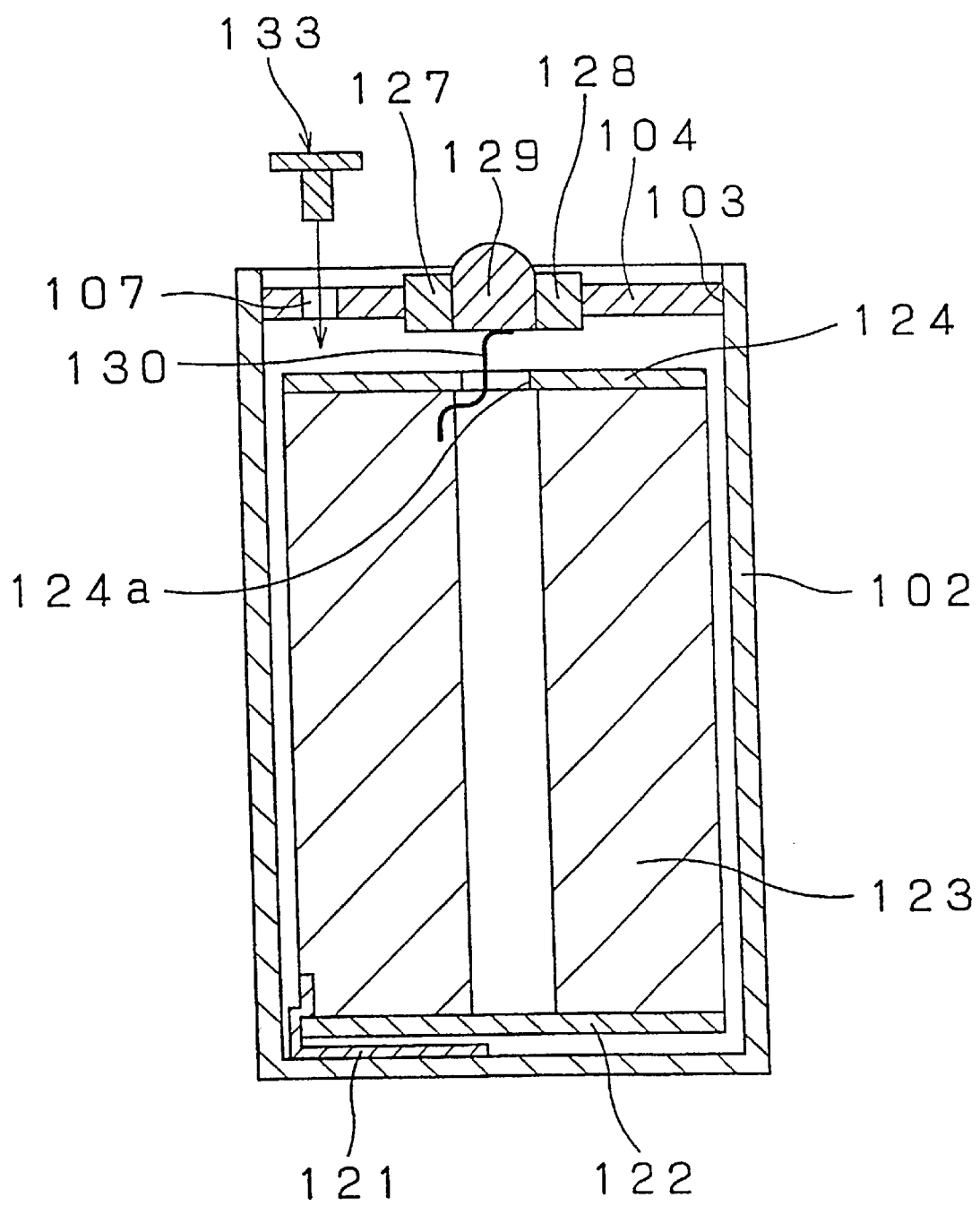
Figure 6:
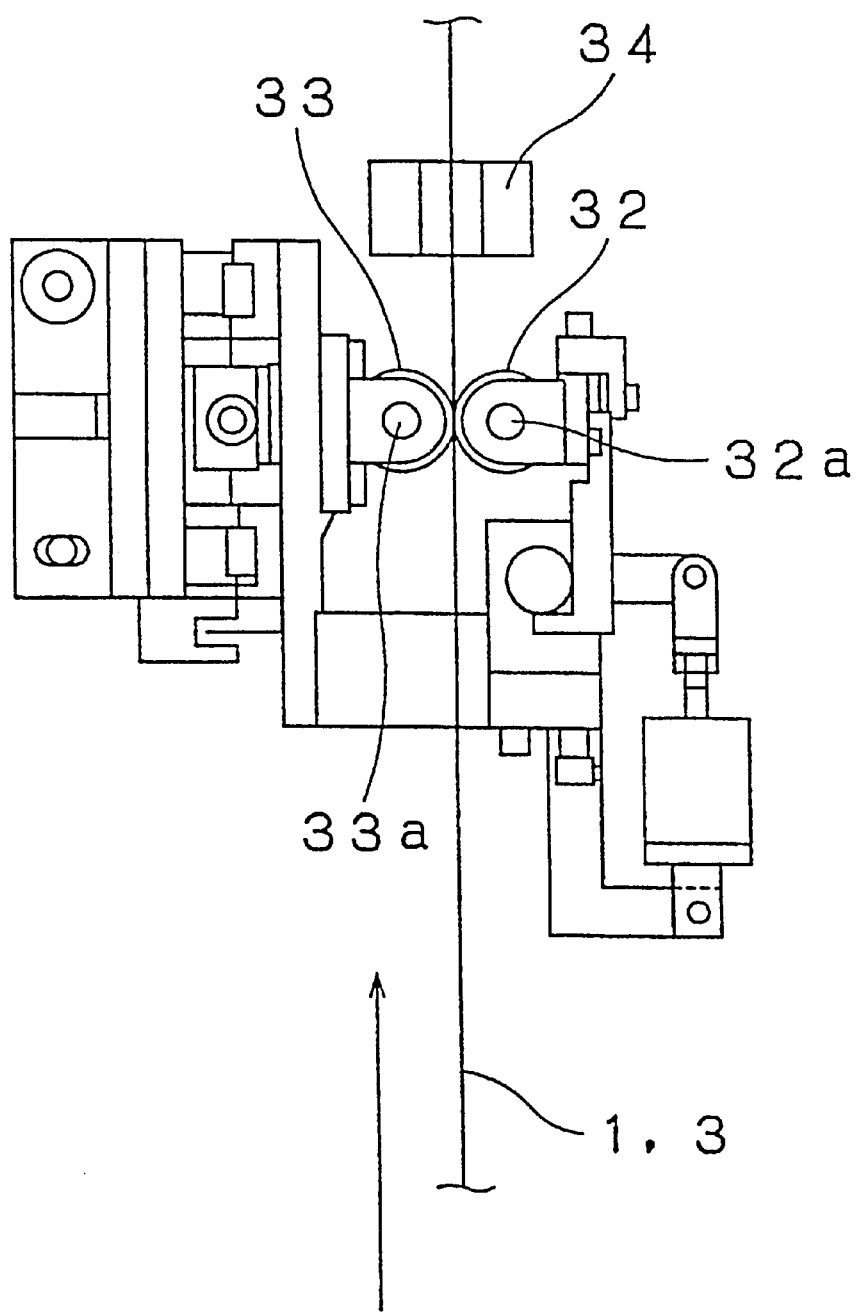
FIG. 6 shows an essential part of a typical conventional edge position correcting unit.
Figure 7:
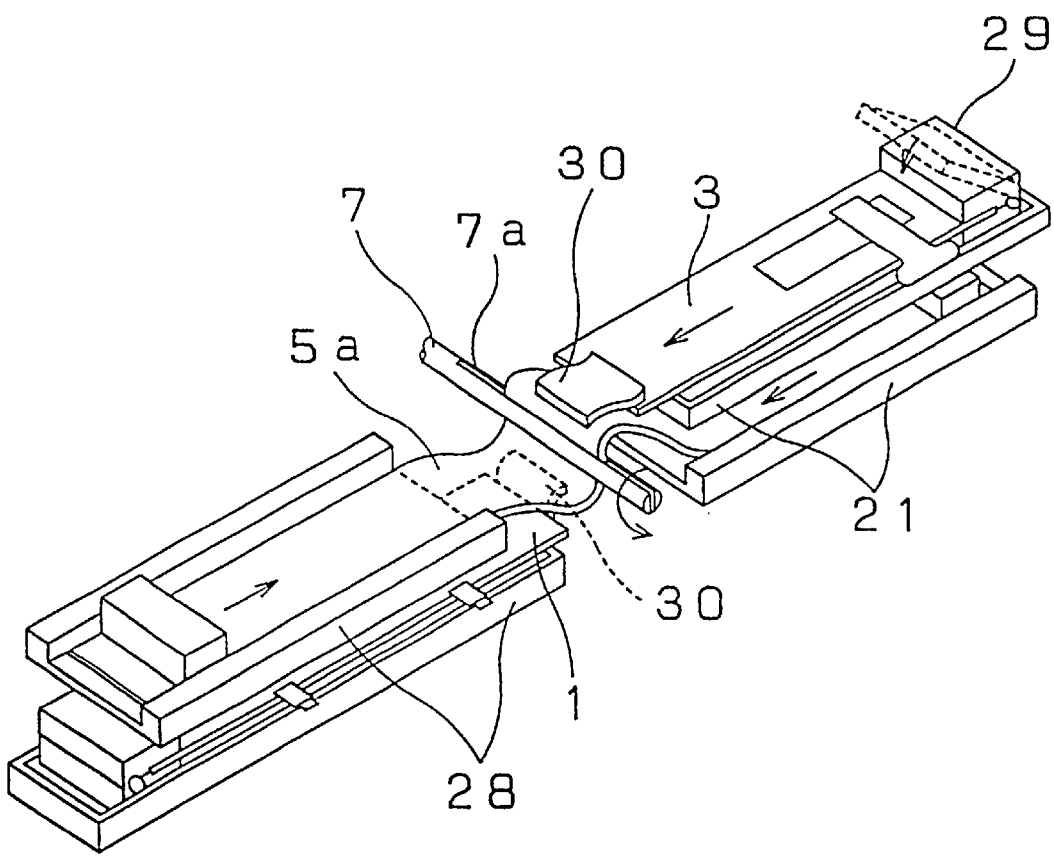
FIG. 7 shows an essential part of another typical conventional edge position correcting unit.
Figure 8:
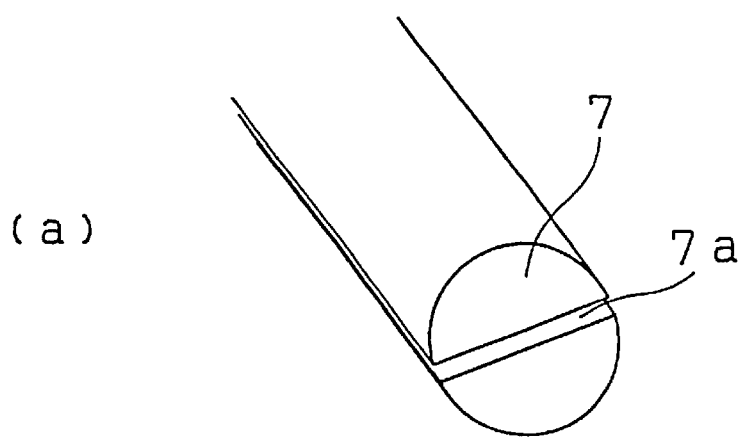
FIGS. 8 (a), (b) and (c) show a conventional winding core, a cross-sectional view of a conventional wound spiral electrode group and a cross-sectional view of a conventional spiral electrode group flattened by applying a pressing force thereto, respectively.
Figure 8:
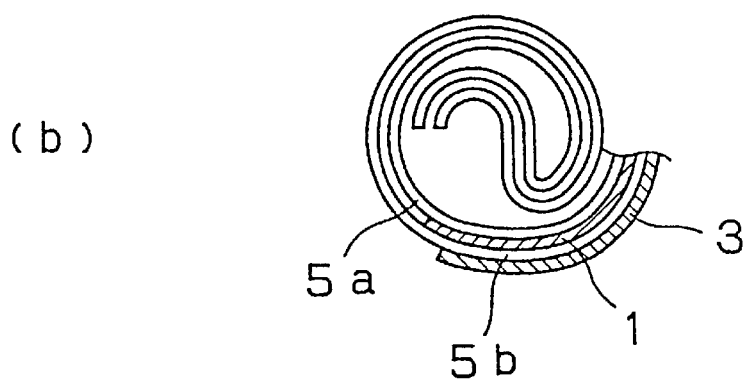
Figure 8:
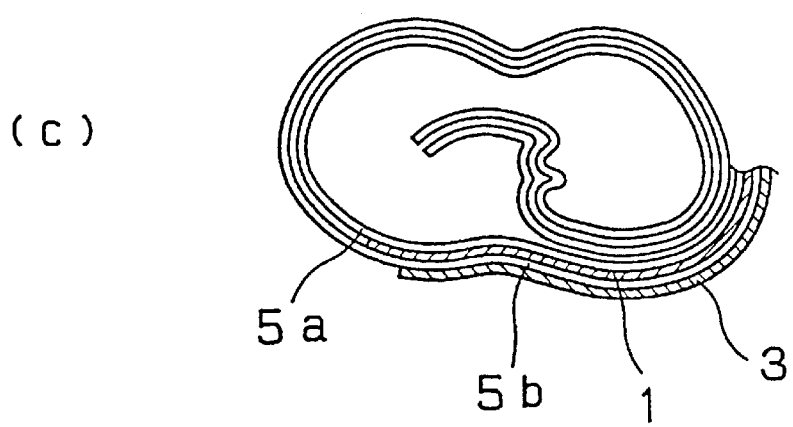
Figure 9:
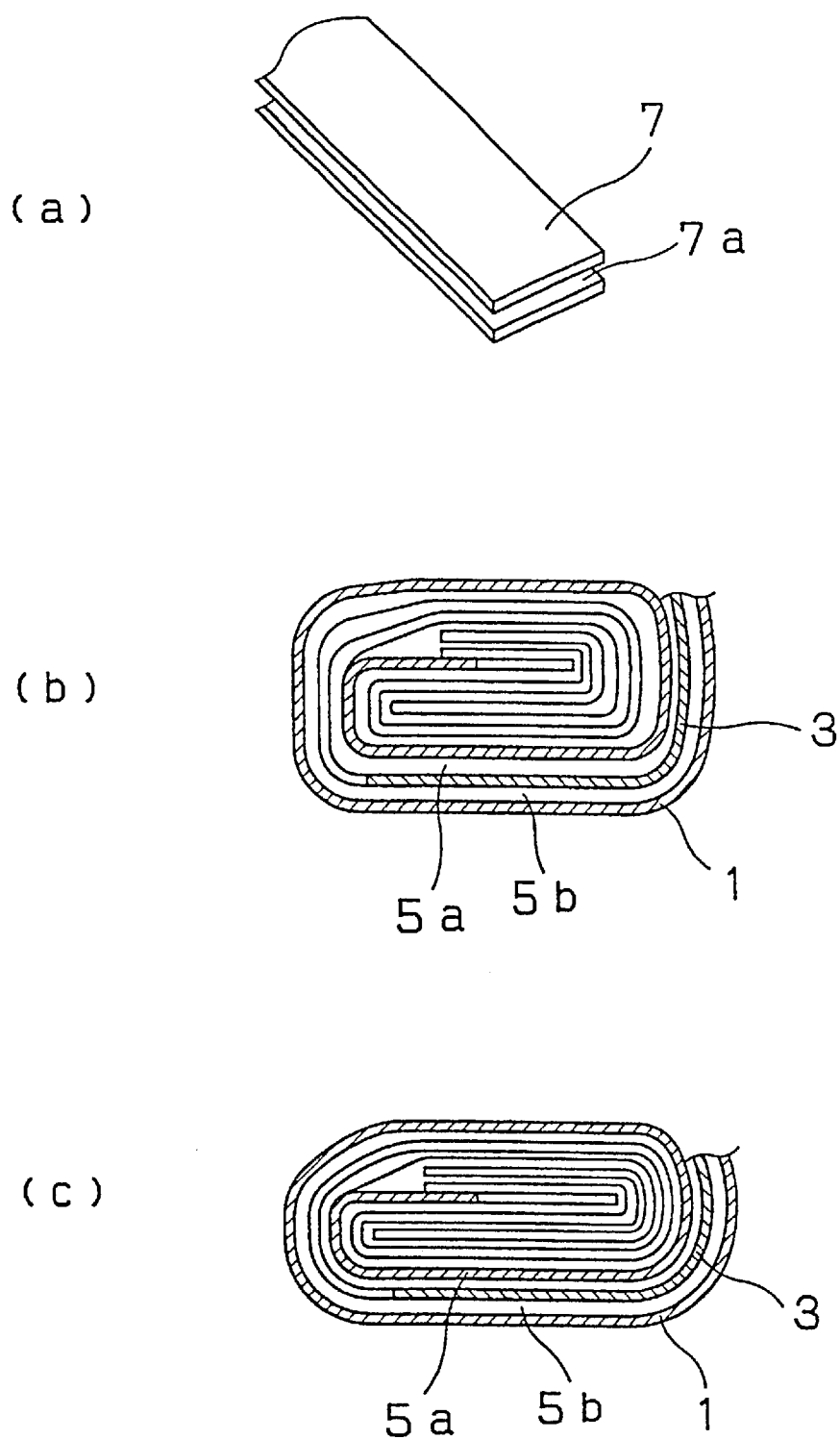
FIGS. 9 (a), (b) and (c) show another conventional winding core, a cross-sectional view of another conventional wound spiral electrode group and a cross-sectional view of another conventional spiral electrode group flattened by applying a pressing force thereto, respectively.

In FIG. 2, cathode plate 1 and anode plate 3, each being wound to a roll shape, and first separator 6a and second separator 6b are fit separately to unreeling axes (not shown in FIG. 2), respectively. The winding section of the device comprises rotational table 26 with four winding cores 7 attached thereto, each winding core 7 appearing like a hexagon in cross section as FIG. 4 shows. Along the transportation route of each respective electrode material extending from the unreeling axis to the winding core are disposed tension unit 8, meandering prevention unit 9, transportation rollers (since there are many rollers in place, no reference numerals are assigned thereto) and the like. Immediately before the place where winding core 7 is located, edge position correcting unit 25 is disposed as FIG. 1 shows. Cathode plate 1 is moved from the upper right to the lower left towards winding core 7 as shown in FIG. 1 and edge position detecting unit 10 for detecting the edge positions of cathode plate 1 is disposed at a predetermined position of the transportation route that is near the distal end part of the electrode plate extending over a length sufficient to finish one winding of the spiral electrode group. (Since the edge position correcting method is the same for an anode plate and a cathode plate, a description is presented hereunder of the case of the cathode plate and the description of the case of the anode plate is omitted.) Near edge position detecting unit 10 is disposed edge position correcting chuck 11 which grips the cathode plate on both surfaces thereof with a pair of fingers of the chuck extending in the directions perpendicular to the running direction of the cathode plate and is allowed to move in the direction perpendicular to the running direction of cathode plate 1 with the help of ball screw 15 and servomotor 16. Tension applying chuck 12 located near edge position correcting chuck 11 but closer to winding core 7 allows cathode plate 1 to be held by gripping on both upper and bottom surfaces thereof or to be released via the operation of tension applying chuck switching operation unit 22, and is allowed to move by sliding along guide 21 disposed in parallel to the running direction of cathode plate 1 with the help of belt 19 put in place between pulley 17 and pulley 18 that are driven by servomotor 20, thereby enabling a tension suitable for winding the electrode group to be applied to cathode plate 1, the tension being adjusted according to the rotational torque of servomotor 20, the diameter of pulley 17 and the like. Also, start position locating chuck 13 disposed between tension applying chuck 12 and winding core 7 grips cathode plate 1 on both upper and bottom surfaces thereof or releases cathode plate 1 and, is made movable in parallel to cathode plate 1 by ball screw 23 and servomotor 24. There is an electrode plate cutter 14 located toward the front near winding core 7, thereby allowing cathode plate 1 to be cut according to a control signal. A separator cutter (not shown in FIG. 1) is located at a mid-position between a predetermined position of winding core 7 and a winding core finished with winding just before, thereby realizing the structure whereby a separator is cut according to a control signal.

Next, a description is given of how the spiral electrode group winding method in the present exemplary embodiment works. Both cathode plate 2 and anode plate 4, first separator 6a and second separator 6b, each of which is wound in a roll shape, are fit on four separate unreeling axes (not shown in the drawing), respectively. Each respective electrode material of the foregoing is guided through meandering prevention unit 9, tension unit 8, a plurality of transportation rollers and the like in the course of transportation between the unreeling axis and the winding core, and sent out towards winding core 7 by a winding force created by the rotation of winding core 7 as the unreeling axis rotates.

In the foregoing course of transportation, the electrode plate wound in a roll shape tends to possess a velocity component in the direction perpendicular to the running direction thereof due to a variation in thickness of the electrode materials and the like, thereby causing the edge positions of the electrode materials to be changed and allowing sometimes a staggered winding to be created in the electrode group.

Therefore, edge position correcting unit 9 is disposed near each respective unreeling axis, thereby allowing each of roll shaped electrode materials 2, 4, 6a and 6b to move together with the unreeling axis fit therewith in the direction of the axis and achieving the correction of the edge position of each respective electrode material.

Even thereafter, as the electrode materials are transported by rotating rollers while being kept in contact with a few electrode material transporting rollers, the edge positions of the electrode materials are likely to change. Up to this point, the conditions with respect to the electrode materials are the same as the conventional electrode group winding method.

Therefore, with respect to cathode plate 1 or anode plate 3, for which the staggered winding is not acceptabe the winding method of the present invention performs the winding process with edge position correcting unit 25 employed for the respective electrode plates. A detailed description is given thereof the following.

Upon finishing the step of winding cathode plate 1 extending over the length required to produce one electrode group via the rotation of winding core 7, the rotation of winding core 7 comes to an end. Tension applying chuck 12 also comes to a halt at the position closest to winding core 7. Just at the time when cathode plate 1 stops running momentarily, start position locating chuck 13 is activated to grip cathode plate 1 constituting the next electrode group at the place near the tip end thereof. Then, tension applying chuck switching operation unit 22 is activated to open tension applying chuck 12, thereby transferring the role of gripping cathode plate 1 to start position locating chuck 13 so as to prevent the staggered winding from occurring. Tension applying chuck 12 relieved of the role of gripping the cathode plate is driven by tension applying servomotor 20, pulleys 17 and 18 and belt 19 to move along guide 21 and returns to the place near edge position correcting chuck 11, thereby being put into a standby state.

Almost at the same time as start position locating chuck 13 grips cathode plate 1, electrode plate cutter 14 is operated to cut cathode plate 1 to a predetermined length and start position locating chuck 13 is put into a standby state at the same place until the next round of electrode group winding starts. When cathode plate 1 is cut by electrode plate cutter 14, the end part of cathode plate 1 wound around winding core 7 is released from all chucks and, by rotating winding core 7 a little, the end part is wound around winding core 7 together with separator 5a separator 5b and the like and then the rotation of winding core 7 is brought to a halt. Since the rotation of winding core 7 at this time is minimal, the shift in position is too small to cause a problem.

When winding both electrode plates by the length needed to finish the step of winding one electrode group is over, rotating table 26 carrying winding core 7 rotates by a quart turn and next winding core 7 comes to a predetermined position. At that position, winding core 4 is pushed out in the direction of the axis and, when separators 5a and 5b reach predetermined positions while being held between separator holding slits separator cutters (not shown in the drawing) are operated to cut separators 5a and 5b and the remaining portions thereof are wound, thereby bring the step of winding the electrode group by previous winding core 7 to an end.

Almost at the same time as this process is performed, cathode plate 1 is gripped securely by fingers of edge position correcting chuck 11 on both upper and bottom surfaces thereof. At the same time, the edge position of cathode plate 1 is detected by edge position detecting unit 10 and the detecting result is sent to a control circuit to find out the displacement between the edge position of cathode 1 and the reference edge position at that time. Then, by moving position correcting chuck 11 in the direction perpendicular to the running direction of cathode plate 1 by the use of ball screw 15 and servomotor 16, the edge position of cathode plate 1 is allowed to coincide with the reference position.

When the edge position of cathode plate 1 is corrected to be brought into agreement with the reference position, tension applying chuck 12 having been put into a standby state at the predetermined position, while the corrected positions being maintained to prevent the shift in position from occurring, grips securely the distal end part of each respective electrode plate with a length needed for completion of one electrode group. Then, edge position correcting chuck 11 is opened and returned to a standby position based on a sequence control directive.

When the foregoing steps are finished winding core 7 starts rotating and, at the same time, start position locating chuck 13 having been put into a standby state is moved towards winding core 7 by means of servomotor 24 and ball screw 23, thereby having the tip end part of cathode plate 1 inserted between separators. Upon starting the winding step, star position locate rig chuck 13 is released and returns to a standby position. As cathode plate 1 is being wound, tension applying chuck 12 is moved by sliding along guide 21 and cathode plate 1 transported with an application on of tension, which is suitable for winding the electrode group and determined according to the rotation torque of servomotor 20, the diameter of pulley 17 and the like, is moved towards winding core 7 while the shift in position is prevented from occurring.

When cathode plate 1 with a length needed for one electrode group is almost wound by the rotation of winding core 7, the rotation of winding core 7 is stopped and also tension applying chuck 12 is brought to a halt at the position nearest winding core 7. Then, start position locating chuck 13 and electrode plate cutter 14 are activated to have cathode plate 1 cut and the operation of edge position correcting unit 25 is repeated.

Figure 3:
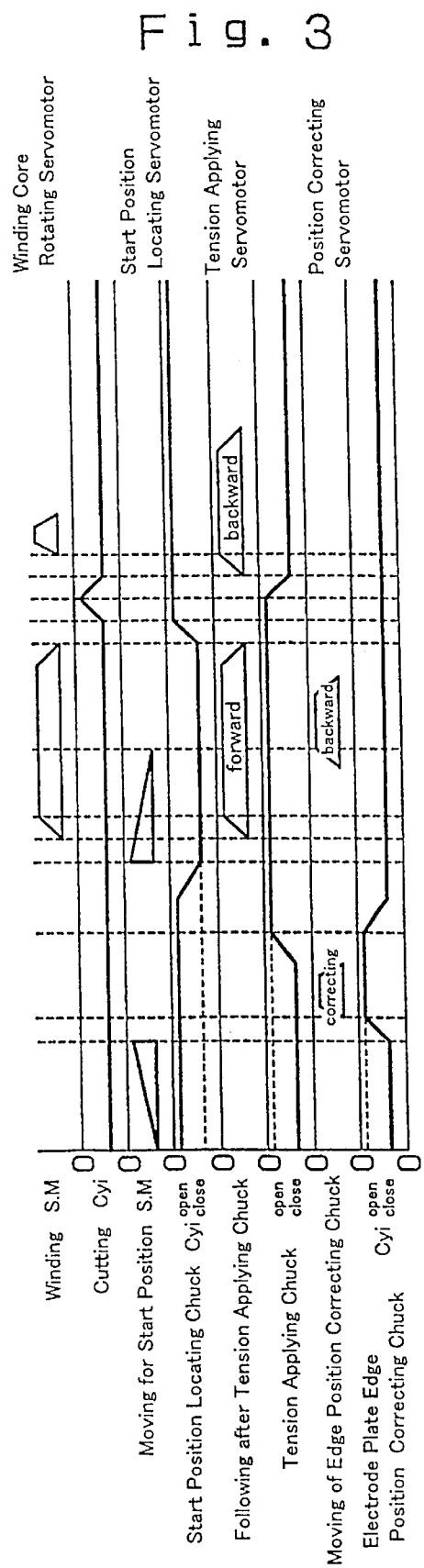
FIG. 3 is a timing chart of the operation of an essential part of the electrode group winding device of the present invention.

FIG. 3 is a timing chart to describe the foregoing operation more explicitly.

FIG. 4(a) is a cross-sectional view of the winding core of the present invention, the vertical cross section of which appears almost like a hexagon, FIG. 4(b) is a cross-sectional view of an electrode group formed by winding electrode materials around the foregoing winding core and FIG. 4(c) is a cross-sectional view of the foregoing electrode group flattened by applying a pressing force thereto. As seen in FIG. 4(c), the use of the winding core of the present invention makes it possible to realize an electrode group, the cross section of which looks like oval shapes uniformly arranged, extending from the inner periphery to the outer periphery.

Next, a description is given of a battery containing an electrode group prepared according to the present invention with reference to the drawings. The tip end part of cathode lead 121 is connected by welding to the inner bottom staircase of bottomed prismatic battery case 102 with opening 103 provided on the upper end thereof Electrode group 123 is placed by section in the interior of battery case 102, in which cathode lead 121 is compart mentalized by means of cathode insulating plate 122 so as to have cathode lead 121 electrically insulated. Further, the upper end part of electrode group 123 is electrically insulated by means of cathode side insulating plate 124. On the other hand, in a process separate from the foregoing, anode terminal 129 is mounted An sealing plate 104 with electrolyte filling hole 107 formed on the side part thereof in such a manner as to be electrically insulated via insulating gasket 128 at mounting hole 127 located in the center thereof Anode lead 130 taken out of electrode group 123 through feed-through hole 124a of anode insulating plate 124 is connected by welding to the bottom surface of anode terminal 129. Sealing plate 104 is fit in opening 103 of battery case 102 at a predetermined position thereof and fixed securely by welding between the periphery of sealing plate 104 and the inner periphery of battery case 102. Thereafter, a predetermined amount of electrolyte (not shown in the drawing) is filled in battery case 102 via electrolyte filling hole 107 of sealing plate 104 thereby forming an electricity generating element out of the electrolyte and electrode group 123 impregnated with the electrolyte.

The winding finished electrode group of the present invention has a cross section shaped like a hexagon as FIG. 4(b) shows and, when the electrode group is flattened by shaping, the bending positions of the electrode group are fixed, thereby allowing the positions, at which electrode lead wires are taken out, to be maintained constant. Since the dimension of separator holding slit 7a of the present invention's winding core is equal to the two plane width of the hexagonal cross section of the winding core, the step of taking the winding finished electrode group off the winding core is easier than the case where winding is performed with the use of a flat winding core, thereby allowing the extent of adverse effects imposed on flatness to be made minimal and making it possible to realize an electrode group, the cross section of which looks like oval shapes uniformly arranged as shown in FIG. 4(c). Therefore, the workability of the step of shaping an electrode group into a flat form and also the step of placing the electrode group into a battery case is improved. Furthermore, when an electrolyte is filled in the battery case, the retainability of the electrolyte is excellent and the battery containing the electrode group of the present invention excels in high rate discharge characteristics and also exhibits stability in quality.

Industrial Applicability

As described above, according to the present invention, when electrode groups are wound for use in lithium secondary batteries, in particular, the shift in position caused to various kinds of electrode materials including anode and cathode plates in the direction perpendicular the direction of transportation is detected by means of a sensor, an electrode plate is gripped by a chuck and the electrode plate is moved together with the chuck in the direction perpendicular 40 the running direction of the electrode plate, thereby connecting, the shift in position of the electrode plate.

Further, a start position locating chuck grips part of the electrode plate, the position of which is accurately corrected, and feeds the electrode plate to a winding core. Then, an edge position correcting chuck or a tension applying chuck grips part of the electrode plate and the electrode plate is wound around a winding core shaped like a hexagon in cross section as the winding core rotates while the shift in position of the electrode plate is prevented from occurring by always applying a proper tension thereto, thereby making it possible to provide an electrode group winds method and a device for winding electrode groups that allow the electrode groups showing an extremely small amount of staggered winding and excellent flatness to be realized. In addition, the batteries containing the electrode groups prepared according to the present invention so as to exhibit a uniform cross section extending from the start to the end of winding and also excellent flatness excel in production yield rate and maintain stability in quality.

What is claimed is:

1. A battery electrode group winding method comprising:
   detecting an edge position of an electrode plate in a width direction by means of an edge position detecting unit located at a predetermined position;
   correcting said edge position based on a detection result of said edge position detecting unit;
   gripping said electrode plate by using a tension applying chuck put in place slidably along a guide disposed perpendicularly to an axis of a winding core;

gripping said electrode plate by means of a start position locating chuck put in place slidably in a running direction of said electrode plate between said winding core and said tension applying chucks;

winding a tip end part of said electrode plate that is moved by said start position locating chuck perpendicularly to said winding core's axis around said rotating winding core under a condition where said electrode plate's edge position is kept at a predetermined position while a tension is imposed on said electrode plate by means of said tension applying chuck; and cutting said electrode plate while said start position locating chuck grips said electrode plate, when said tension applying chuck reaches a position closest to said winding core.

2. The battery electrode group winding method according to claim 1, wherein an edge position correcting chuck is provided for each of said anode and cathode plates;

said each respective electrode plate is gripped by a pair of fingers of said edge position correcting chuck that extend in a direction perpendicular to a running direction of said electrode plate; and an edge position of said electrode plate is corrected by having said electrode plate moved in a direction perpendicular to a running direction thereof by a chuck driving means formed of a servomotor and a ball screw.

3. The battery electrode group winding method according to claim 1, wherein said electrode plate is cut by an electrode plate cutter moving in a direction perpendicular to an axis of said winding core when said respective anode and cathode plates are moving towards said winding core.

4. The battery electrode group winding method according to claim 1, wherein said winding core has a cross section, which is perpendicular to an axis thereof, shaped like a hexagon.

5. A battery electrode group winding device comprising:

an edge position detecting unit located at a predetermined position of said device for detecting an edge position of an electrode plate in a width direction;

an edge position correcting chuck for correcting said edge position based on a detection result of said edge position detecting unit;

a tension applying chuck put in place near said edge position correcting chuck towards said winding core in such way as to be slideable along a guide disposed perpendicularly to an axis of said winding core, thereby allowing said electrode plate to be gripped or released;

a start position locating chuck put in place slidably in a running direction of said electrode plate between said winding core and said tension applying chuck, thereby allowing said electrode plate to be gripped or released; and an electrode plate cutter for cutting said electrode plate disposed between said start position locating chuck and said winding core.

6. The battery electrode group winding device according to claim 5, wherein an edge position correcting chuck is provided for anode and cathode plate respectively, and an edge position of the electrode plate is moved for correction perpendicularly to a running direction of said electrode plate by a chuck driving means formed of a servomotor and a ball screw after having said electrode plate gripped on both surfaces thereof with a pair of fingers of said chuck extending perpendicularly to a running direction of said electrode plate.

7. The battery electrode group winding device according to claim 5, wherein a cross section perpendicular to said winding core's axis is shaped like a hexagon.

8. A battery produced by sealing in a battery case a battery electrode group wound according to a battery electrode group winding method comprising:

detecting an edge position of an electrode plate in a width direction by means of an edge position detecting unit located at a predetermined position;

correcting said edge position based on a detection result of said edge position detecting unit;

gripping said electrode plate by using a tension applying chuck put it in place slidably along a guide disposed perpendicularly to an axis of a winding core;

gripping said electrode plate by means of a start position locating chuck put in place slidably in a running direction of said electrode plate between said winding core and said tension applying chuck;

winding a tip end part of said electrode plate that is moved by said start position locating chuck perpendicularly to said winding core's axis around said rotating winding core under a condition where said electrode plate's edge position is kept at a predetermined position while a tension is imposed on said electrode plate by means of said tension applying chuck; and cutting said electrode plate while said start position locating chuck grips said electrode plate, when said tension applying chuck reaches a position closest to said winding core;

wherein said battery electrode group is flattened by applying a pressing force to said battery electrode group; and wherein said winding core has a cross section, which is perpendicular to an axis thereof, shaped like a hexagon.

* * * * *